(12) United States Patent
Shea

(10) Patent No.: US 10,112,794 B1
(45) Date of Patent: Oct. 30, 2018

(54) REMOVAL MACHINE TO TAKE PAVEMENT MARKINGS OFF OF PAVED SURFACES

(71) Applicant: James P. Shea, Waterford, MI (US)

(72) Inventor: James P. Shea, Waterford, MI (US)

(73) Assignee: James P. Shea, Waterford, MI (US)

( * ) Notice: Subject to any disclaimer, the term of this patent is extended or adjusted under 35 U.S.C. 154(b) by 0 days.

(21) Appl. No.: 15/808,646

(22) Filed: Nov. 9, 2017

(51) Int. Cl.
| | | |
|---|---|---|
| B32B 43/00 | (2006.01) |
| B62D 63/04 | (2006.01) |
| B65H 18/10 | (2006.01) |
| B65H 18/02 | (2006.01) |
| E01C 23/06 | (2006.01) |

(52) U.S. Cl.
CPC .......... B65H 18/10 (2013.01); B65H 18/026 (2013.01); E01C 23/06 (2013.01); B62D 63/04 (2013.01); C09J 2205/302 (2013.01); Y10T 156/1174 (2015.01); Y10T 156/195 (2015.01); Y10T 156/1978 (2015.01)

(58) Field of Classification Search
CPC .......... Y10T 156/1174; Y10T 156/195; Y10T 156/1168; E01C 23/088; B32B 38/10; B32B 43/006; Y10S 156/929; Y10S 156/94; C09J 2205/302

See application file for complete search history.

(56) References Cited

U.S. PATENT DOCUMENTS

| | | | | | |
|---|---|---|---|---|---|
| 5,452,652 | A | * | 9/1995 | Brooks | A01G 13/0287 100/100 |
| 5,465,489 | A | * | 11/1995 | Meek | A47L 13/08 15/236.08 |
| 6,004,426 | A | * | 12/1999 | Johnson | E04G 23/006 156/715 |
| 6,174,104 | B1 | * | 1/2001 | Fields | E01C 23/08 404/83 |
| 6,413,012 | B1 | * | 7/2002 | Jones | E01C 23/166 239/150 |
| 7,413,626 | B2 | * | 8/2008 | Anderson | B29C 63/0013 156/715 |
| 8,251,117 | B2 | * | 8/2012 | Kron | E04G 23/006 156/715 |
| 9,604,443 | B2 | * | 3/2017 | Sun | B32B 43/006 |

* cited by examiner

*Primary Examiner* — Mark A Osele
(74) *Attorney, Agent, or Firm* — Brinks Gilson & Lione

(57) ABSTRACT

A temporary tape removal apparatus that includes: a chassis having fixed and guiding wheels; a boom arm extending outward from the chassis and being movable between up and down and side to side positions; a spool assembly including a rotatable spool for winding used temporary tape thereon mounted on the boom arm; and controllable drive means to rotate the rotatable spool. Using the apparatus to remove lane marking tape from pavements involves moving the temporary tape removal apparatus along a pavement having a length of lane marking tape thereon, and pulling the lane marking tape off the pavement by winding the tape onto the spool. Single lines of tape can be removed and multiple lines of tape can simultaneously be removed. The removed tape is spooled on disposable cores for disposal.

20 Claims, 9 Drawing Sheets

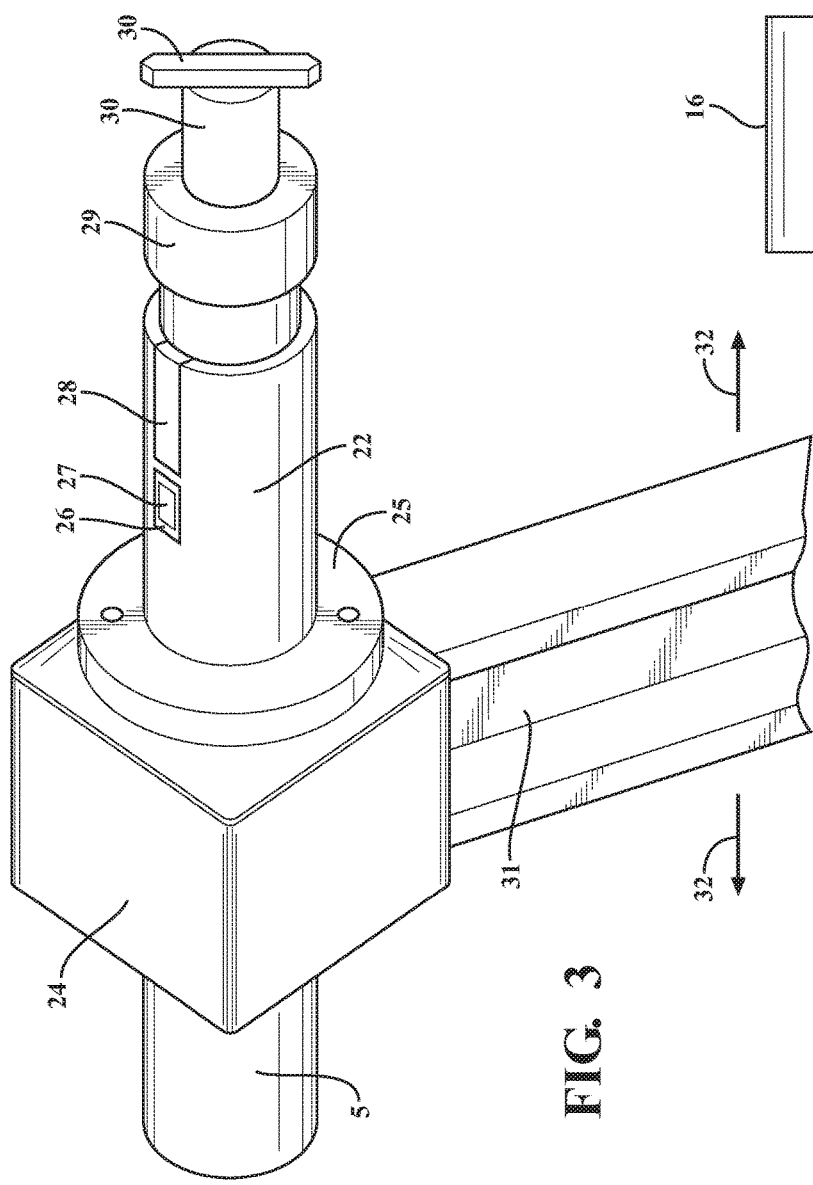
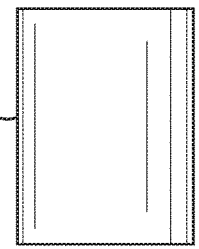
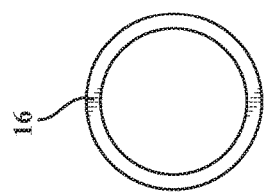
FIG. 3
FIG. 4A
FIG. 4B

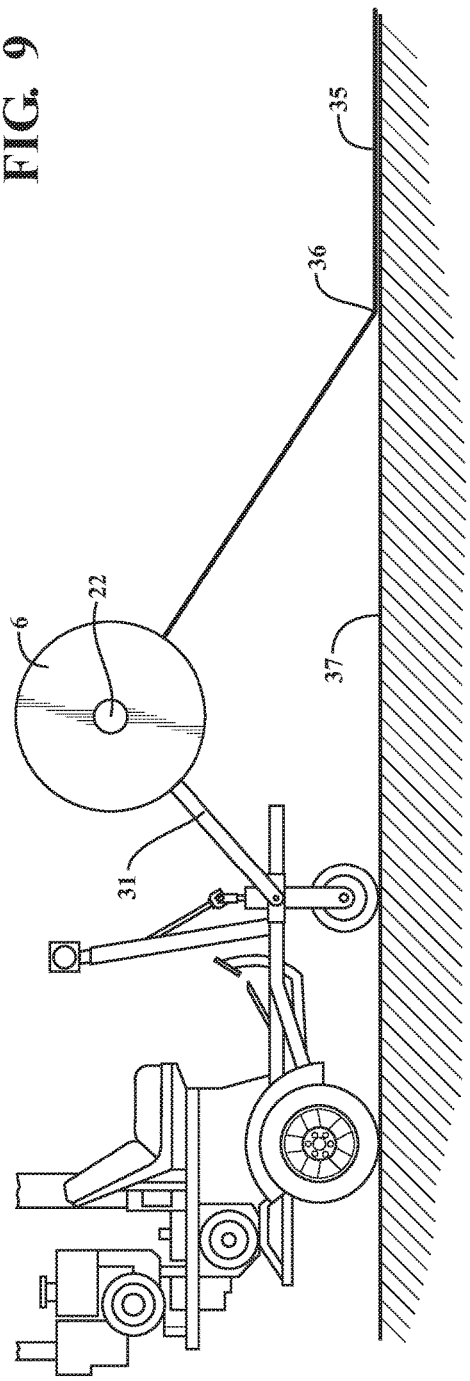
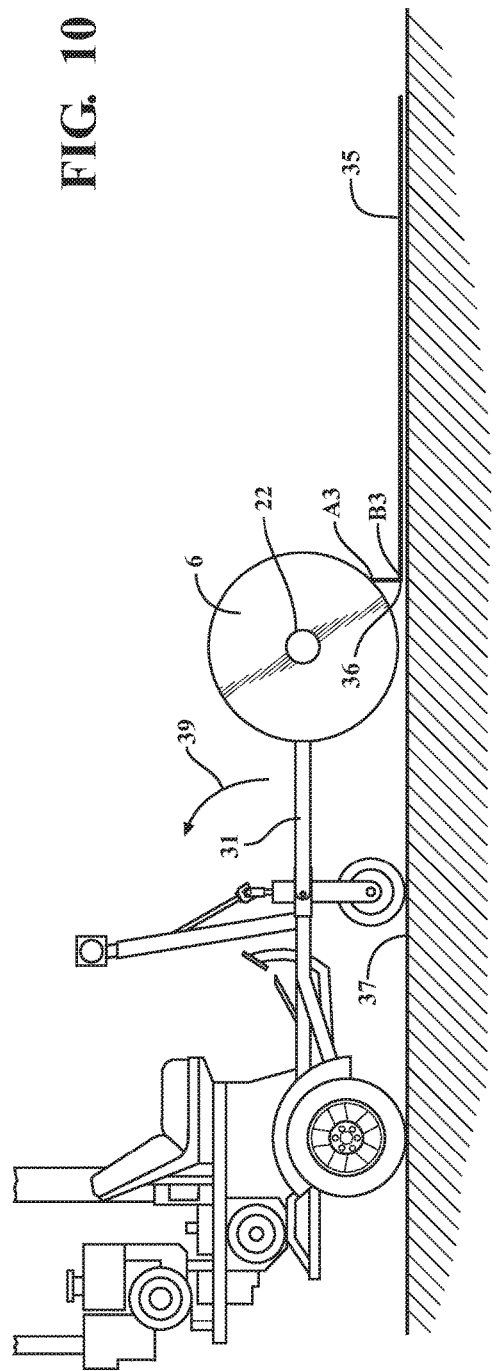

REMOVAL MACHINE TO TAKE PAVEMENT MARKINGS OFF OF PAVED SURFACES

BACKGROUND

The present invention relates to the removal of marking tapes that function as lane dividers on roads, airport runways, parking lots, bicycle paths or other paved surfaces. More particularly the present invention relates to machines that are designed to remove such marking tapes from roads, airport runways, parking lots, bicycle paths and other paved surfaces.

Often during the construction, reconstruction, repair or maintenance of paved surfaces mobile or pedestrian travel patterns must be shifted or redirected to allow for uninterrupted and safe movements through such project sites. Before the introduction of removable tapes permanent marking paints/materials were used. Removal of such permanent markings is a slow operation. Among the methods used to remove permanent markings are grinding, milling, shot blasting, sand blasting and water blasting. Each of these removal methods causes undesirable damage to the paved surfaces.

Removable temporary marking tapes were developed in the late 1970's to the early 1980's. The quality of these tapes has improved continually. Initial application of these removable marking tapes was slow and labor intensive. Over time methods of applying these removable tapes have improved lowering the amount of physical labor and time required to apply them.

Removing removable temporary marking tapes has always been a slow and extremely physical process. The labor involved is slow, exhaustive and demoralizing and places workers in hazardous situations. Many injuries have occurred. A limited number of machines have been developed to mechanize temporary marking tape removal, none of which have been practical. None have been effective. In fact, over the almost 30 years since introduction of temporary marking tapes, no removal machine has ever been produced commercially for sale or use that functions adequately. There has been a long felt need for a functional marking tape removal machine that can facilitate the removal of temporary pavement markings from paved surfaces.

Temporary marking tape used as lane markings is generally supplied in rolls. The rolls vary in length, width and weight. Standard widths can be 4 inches, 6 inches, 7 inches, 8 inches or 12 inches and can weigh up to 70 pounds.

Structurally temporary marking tape includes a top coat, internal netting and an adhesive. It is manufactured in stock rolls that can be from 36 to 42 inches wide and cut into standard usable widths. The stock rolls can be of varying length segments. The ends of adjacent segments of a roll are spliced together in a butt joint to produce a single roll having a desired overall length. When the required length of the tape roll is reached it is cut off and sent for further processing into appropriate widths. A roll of tape often includes multiple splices.

A combination of the top coat and netting provides the maxim pull strength of the tape. At butt joints between adjacent segments of a roll both the top coat and netting are severed. Splice material is used to join the ends of adjacent segments of the rolls together creating a joint area that is weaker than the uninterrupted segments of tape.

In addition to factory splices that join adjacent segments of rolls of tape, when the tape is applied on paved surfaces it is subject to stresses that cause weak points or areas of separation (breakage) to develop. Heavy traffic, turning movements by motor vehicles or construction vehicles can also damage tape and result in breakage. In some instances the damage to the tape can be so severe that it can only be removed manually. Applying the marking tape over expansion dams at bridges creates separation (breakage) of the tape at these areas. Wide pavement joints, heavily tined pavement, pot holes or other surface irregularities all are prone to cause separation (breakage). In any given length of temporary tape that is on a paved surface there can be many weakened points or points of separation (breakage).

Over the more than 35 years since the introduction or temporary marking tape no practical machine has been designed, developed or manufactured that can successfully remove temporary lane marking tapes. Challenges to designing and developing a suitable machine have to account for tape separations/breakage caused by vehicle turning movements, factory splices, wide pavement joints, heavy pavement tinning, texturing, pot holes, or surface irregularities. Since encountering long continuous, uninterrupted lengths of tape is seldom encountered in practice, any acceptable machine has to be able to efficiently remove lengths of tape that are subject to separation (breakage). In addition any machine design needs to be able to operate practically and safely in construction sites/zones in which construction and vehicular traffic flow can be hazardous.

The present invention provides a Motorized Tape Removal Apparatus (MTRA) that is designed and constructed to remove and handle tape has been removed in a manner that reduces the amount of labor and time it has taken in the past to remove and handle the tape. In addition to reducing the amount of time it has taken to handle and transfer removed tape into a dumpster the MTRA of the present invention greatly reduces the volume of removed tape thereby requiring less dumpster space which reduces disposal costs.

The MTRA of the present invention is safe to operate, compact and is designed to remove marking lines that have multiple breaks or weakened points efficiently.

The MTRA of the present invention is configured to allow for the simultaneous removal of adjacent or abutting multiple lines of marking tape. In this regard according to one embodiment the design of the MTRA allows for removable retainer discs to be positioned on the spindle shaft with disposable cores, so that the cores match the tape line widths of adjacent or abutting tape widths to be removed from a paved surface. For example two 4 inch wide lines of tape placed side by side could be removed simultaneously with two cores each matching a 4 inch line with a separation disc between the cores. In another example is a 4 inch line of tape placed on a paved surface next to a 6 inch line of tape could be removed simultaneously using cores matching a 4 inch line take up and a 6 inch line take up with a separation disc between the cores.

BRIEF SUMMARY

According to various features, characteristics and embodiments of the present invention which will become apparent as the description thereof proceeds, the present invention provides a temporary tape removal apparatus that comprises:

a chassis having fixed and guiding wheels;

a boom arm extending outward from the chassis and being movable between up and down and side to side positions;

a spool assembly including a rotatable spool for winding used temporary tape thereon mounted on the boom arm; and controllable drive means to rotate the rotatable spool.

The present invention further provides a method of removing lane marking tape from pavements which method comprises:

providing a temporary tape removal apparatus that comprises:
a chassis having fixed and guiding wheels;
a boom arm extending outward from the chassis and being movable between up and down and side to side positions;
a spool assembly including a rotatable spool for winding used temporary tape thereon mounted on the boom arm; and
controllable drive means to rotate the rotatable spool;
moving the temporary tape removal apparatus along a pavement having a length of lane marking tape thereon; and
pulling the lane marking tape off the pavement by winding the tape onto the spool.

BRIEF DESCRIPTION OF THE DRAWINGS

The present invention will be described with reference to the attached drawings which are given as non-limiting examples only, in which:

FIG. 3 is a side angle down view of a spindle boom assembly according to one embodiment of the present invention.

FIG. 4A is a face on view of a variable width disposable friction surface wind up core according to one embodiment of the present invention.

FIG. 4B is a side view of the variable width disposable friction surface wind up core of FIG. 4A.

FIG. 9 is a depiction of tape being spooled (removed) with the point of release from the paved surface far in front of perpendicular to the spool.

FIG. 10 is a depiction of the remove of tape while raising the boom arm.

DETAILED DESCRIPTION OF THE DRAWINGS AND THE PRESENTLY PREFERRED EMBODIMENTS

The present invention provides for removing pavement marking tapes from paved surfaces with a Motorized Tape Removal Apparatus (MTRA) rapidly, efficiently and safely. The invention's unique design also allows multiple side by side or longitudinally abutting tape lines to be removed simultaneously. In addition the invention's unique design allows it to remove multiple longitudinally separated lines simultaneously.

The present invention allows for faster and more efficient and safer removal of lines of tape while requiring fewer workers than manual removal methods. The present invention eliminates inherent dangers associated with manual tape removal methods that places works in hazardous situations.

Figure 1:
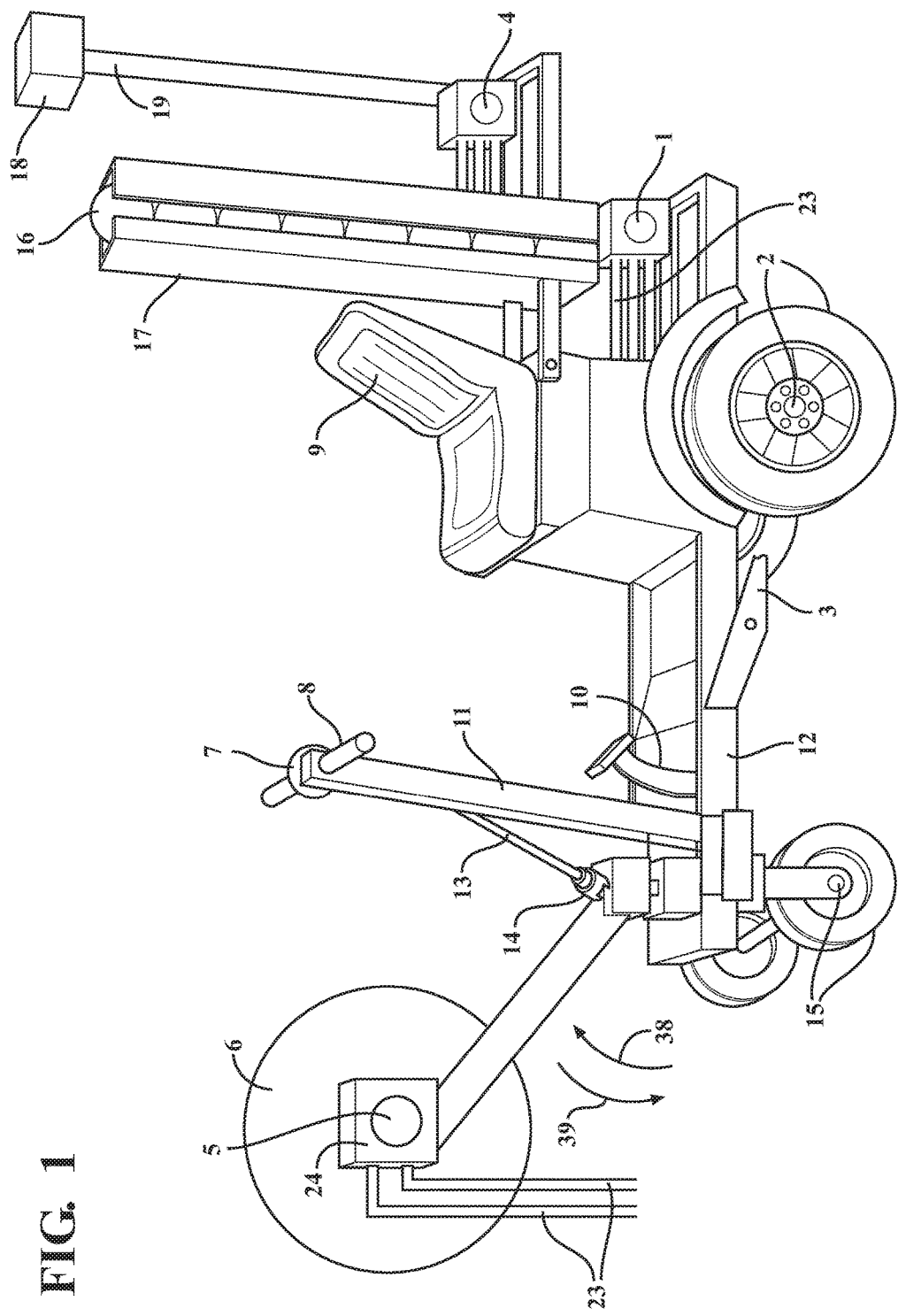
FIG. 1 is a side view of a tape removal apparatus according to one embodiment of the present invention.

FIG. 1 is a left side view of a MTRA according to one embodiment of the present invention that shows a spindle drive hydraulic motor with a fixed retainer disc, core caddy, axle drive hydraulic pump, spindle drive hydraulic pump and safety strobe beacon and post. Hydraulic pump drive engines are not shown in FIG. 1.

The MTRA is relatively short, narrow and compact for ease of handling, loading, transporting and safety during use in construction zones. The relatively small size and modest weight of the MTRA allow it to be easily loaded onto or off of a vehicle with a lift gate or driven onto or off a trailer. Further the relatively small size enables use of the MTRA in construction sites in a manner that avoids its use in paths of vehicular traffic or where construction equipment is being used or moved.

The hydraulic pump 1 is connected to an engine (not shown) and drives drive axle and rear wheels 2 forward, reverse at variable speeds or neutral and is controlled by foot pedal 3. Hydraulic pump 4 is also connected to the engine (not shown) and drives hydraulic motor 5 in via flow in hydraulic lines 23 which rotate fixed inner retainer disc 6 and spool spindle 22 (FIG. 2) through a coupler inside of coupler body 24. Hydraulic motor 5 can be rotated clockwise, counterclockwise or neutral by throttle control 7 that can be similar to a rotational motor cycle style hand throttle controller, or other type of throttle. The throttle control 7 can be mounted on the right side of steering bar 8 or any other location that provides ease of use. It is to be understood that a single engine (not shown) can be used to drive hydraulic pumps 1 and 4 or separate engines (not shown) could be used. Alternatively a combination of mechanical drive systems and motors/engines could be used in place of the hydraulic pumps.

Speed and directional control of the invention is accomplished by a single operator sitting on seat 9. The invention is stopped by depressing brake pedal 10 which puts drive pump 1 in neutral and engages brakes that act on rear wheels 2. A steering column 11 is affixed to the frame or chassis 12 and has a steering bar 8 at the top thereof. By rotating the steering bar 8 in a clockwise or counterclockwise rotary directional motion along the steering column 11 is transmitted through conventional bearings (not shown), steering shafts 13 and joints 14 to the wheel axle assembly 15 directing movement of the MTRA to the left or right. Minor steering adjustments can be effectively accomplished to keep the MTRA in a straight alignment on a tape line for optimal removal speed. Spool spindle 22 (See FIG. 2) is attached at the distal end of boom arm 31 which can be lowered downward and raised upward are indicated by arrows 38 and 39.

Disposable cores 16 around which the removed tape 35 is spooled during tape removal can be cardboard tubes of uniform diameter cut to length to match the line width of tape being removed are carried in core caddy 17.

A flashing beacon 18 is mounted at an elevation above the operator's head on upright tube 19 such that it can be seen from both oncoming and overtaking traffic for purposes of safety.

Figure 2:
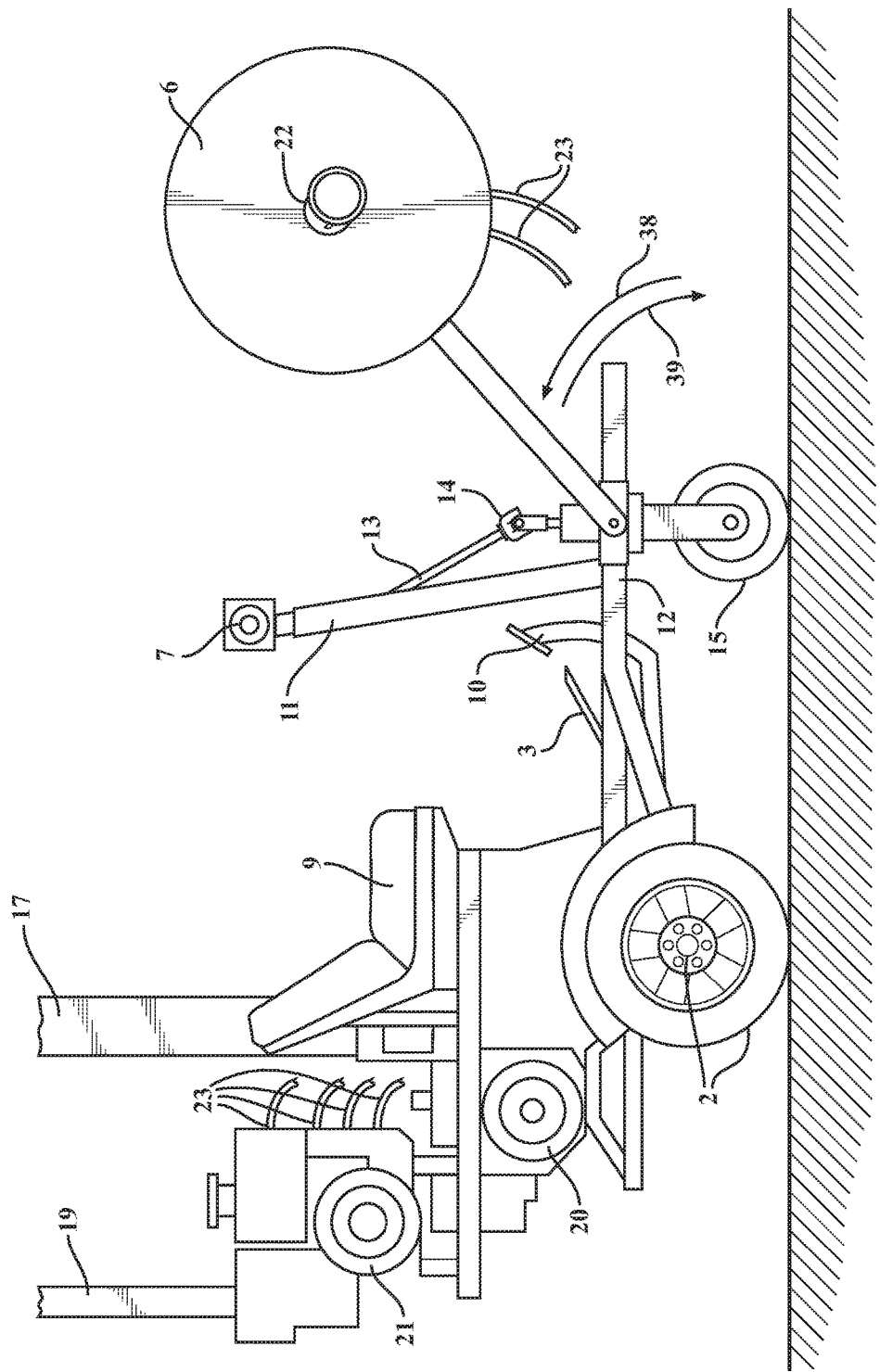
FIG. 2 is a side view of the other side of the tape removal apparatus of FIG. 1.

FIG. 2 is a right side view of the MTRA of FIG. 1 with the boom spool assembly in an right up position with the outside retainer disc 34 (FIG. 5) removed so as to show the spool spindle 22. According to the embodiment of the invention shown in FIG. 2 engine 20 drives hydraulic pump 1 that controls the bidirectional and variable speed drive axle/wheels and engine 21 that drives the hydraulic pump 4 that drives the bidirectional and variable speed hydraulic motor that controls the rotation of spool spindle 22. Various hydraulic lines 23 are shown.

FIG. 3 is a side angle down view of a variable type of spindle boom assembly according to one embodiment of the present invention. In FIG. 3 hydraulic motor 5 is coupled to spool spindle 22 by a coupling that is within coupler body 24. The inner retainer disc 6 that normally connects to connecting flange 25 has been removed in FIG. 3. In the spool spindle 22 a slot 26 is provided that contains a locking lug 27. Forward movement of a tapered wedge (not shown) within spool spindle 22 that is controlled by control knob 30 forces the locking lug 27 upward and into or against the inner wall of a core 16 that has been located in position on the spool spindle 22 thus preventing slippage or free rotation of the core 16 on the spool spindle. The embodiment of the invention in FIG. 3 includes a spool extension 29 that allows for removing wider than normal tape lines. As mentioned above, movement up and down of the locking lug 27 is accomplished by turning the control knob 30 that functions as a jam nut that forces in or pulls back the tapered wedge (not shown) depending on rotation of control knob 30.

According to the present invention the boom arm 31 can be adjusted into multiple positions. It can be moved to the right of the outer right side frame as shown in FIGS. 1 and 2, to the middle of the right and left side frames, or to the left of the left outer side frame. The compact size of the invention and this ability to reposition the take-up boom/spindle assembly allows the operator to always be positioned away a safe distance from moving traffic as well as construction site equipment being used or moving through the construction zone.

Figure 7:
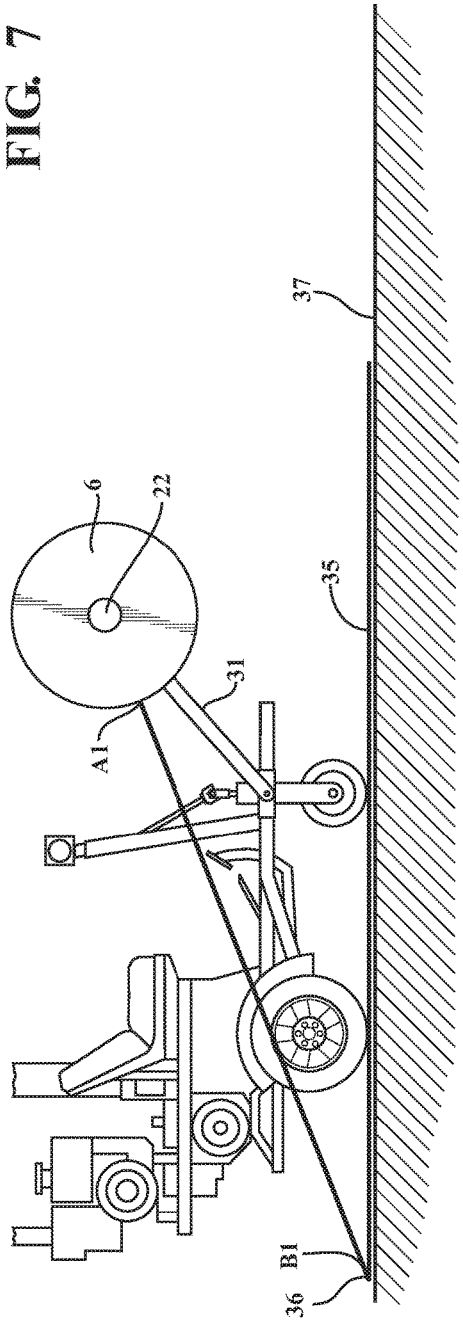
FIG. 7 is a depiction of tape being spooled (removed) with the point of release from the paved surface far to the rear of perpendicular to the spool.
Figure 8:
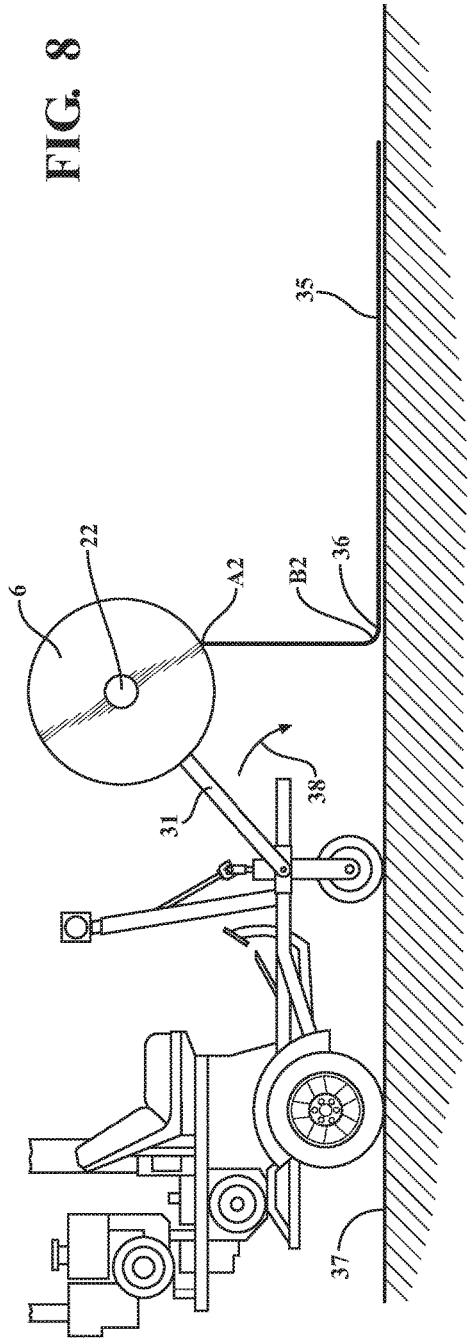
FIG. 8 is a depiction of tape being spooled (removed) with the point of release from the paved surface perpendicular to the spooled tape.

As indicated by arrows 38 and 39 in FIGS. 1 and 2 the boom arm 31 can be adjusted up or down. This movement/positioning of the boom arm 31 allows for the tape to be removed successfully at release points 36 far behind perpendicular, perpendicular, or far in front of perpendicular (as shown in FIGS. 7-9). This means that the operator need not maintain a forward speed that matches the rate of material being spooled. When tape is wound around the core 16 initially more rpm's are needed to spool the tape than when more tape has been wound on the spool. As the diameter of tape wound on the spool increases the rotational speed can be decreased. When weak points in the tape being removed occur the spool can be positioned perpendicular to the release point. Spool rotational speed can also be reduced to reduce tensile pull against the tape at its release point. The boom arm 31 can also be lowered to reduce the pull against the release point further.

FIG. 4A is a face on and side on view of a variable width disposable friction surface wind up core 16 and FIG. 4B is a side on view of the variable width disposable friction surface wind up core 16. The core 16 has a cylindrical shape and can be made of a sturdy, disposable material such as rigid cardboard, and preferably has other than smooth surfaces to rotate with the spool spindle 22 and wind up tape.

Figure 5:
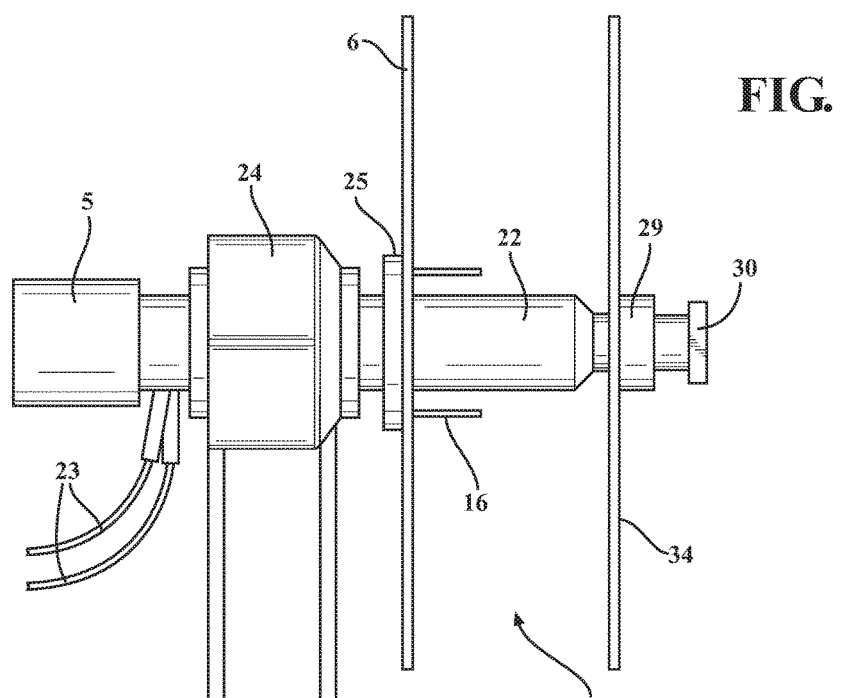
FIG. 5 is a straight on view of a spindle boom assembly according to another embodiment of the present invention.

FIG. 5 is a straight on view of a spindle boom assembly according to another embodiment of the present invention. As indicated by arrows 32 the boom arm 31 can move from side to side from beyond the right side of the frame to beyond the left side of the frame, including positions within the center of the sides of the frame. In FIG. 5 core 16 is shown as having been slid onto the spool spindle 22 adjacent fixed inner retainer disc 6. After the core 16 has been placed in this position a removable outer retainer disc 34 can be pushed tight against core 16 and the outer disc locking flange 29 is secured against the removable outer retained disc 34. These elements define the "spool" or "spool assembly" as referred to herein which has a slot or gap 41 into which removed tape can be received and spooled up on removable core 16.

Figure 6:
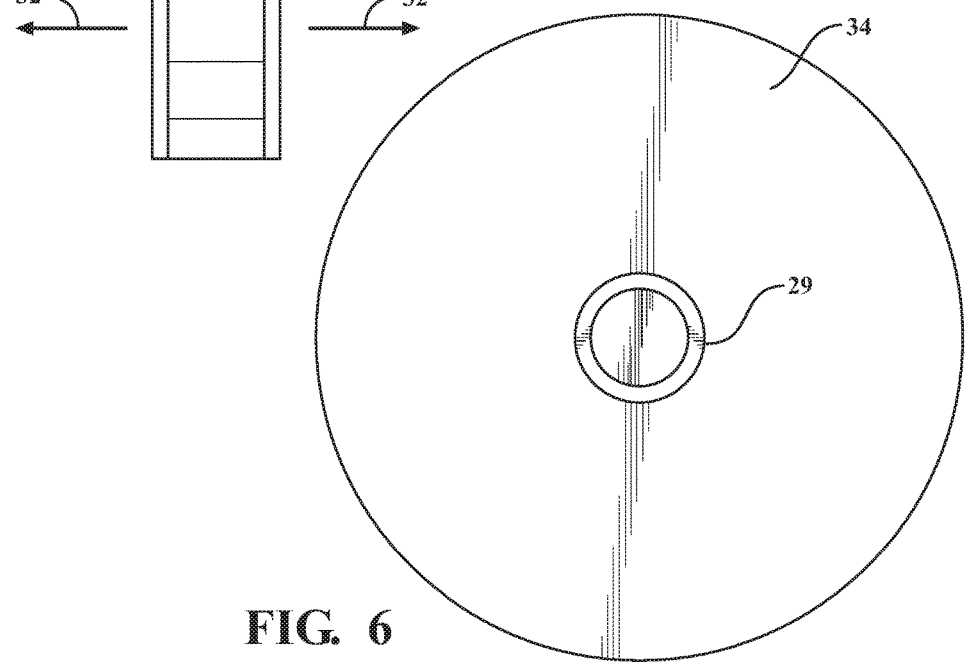
FIG. 6 is a side on view of an outer retainer disc and locking flange according to one embodiment of the present invention.

FIG. 6 is a side on view of the outer retainer disc and locking flange. FIG. 6 shows the removable outer retainer disc 34 and the outer disc locking flange 29 centered about the axis of the spool spindle 22.

FIG. 7 is a depiction of tape being spooled (removed) with the point of release from the paved surface far to the rear of perpendicular to the spool.

FIG. 7 shows tape 35 being removed from a paved surface and being wound onto a spool with boom arm 31 in an up position. The removed tape 35 is wound up on a core 16 provided on spool spindle 22 as shown in FIG. 5. The release point of the removed tape 35 relative to the paved surface 37 is far to the rear of perpendicular to the spool. The distance from the release point B1 to the spool A1 can be varied by controlling the rotational speed of the spool and/or the velocity of the MTRA. If the tape is removed faster than the velocity of the MTRA the release point will tend to move ahead of the MTRA. It is along the distance between A1 and B1 that the pulling force to remove the tape is applied. Being able to remove tape at different release points relative to the spool allows for controlling the rotational speed of the spool and/or the velocity of the MTRA in such a manner to optimize tape removal speed.

Tape adheres to the paved road surface with variable degrees of aggressiveness. As a result, the tensile force required to release the tape from the paved surface can change along a given length of the tape. The present invention provides an operator with the ability to continually vary the forward speed of the MTRA and tape release point 36 from the paved surface 37 to adjust for changing tensile strengths required to remove and spool the tape 35 with the minimum of breakage. When a tape separates (breaks) and the adjacent free ends must be joined together to allow removal to resume, can be wasted and labor increases to remove the tape. To avoid such situations the present invention provides the operator with the ability to vary both forward and reverse speed of the MTRA and the speed and rotational direct of the spool assembly to reduce or avoid incidences of separation (breakage).

Because the position of the spool can be adjusted from the left and right and up and down the present invention does not require any rollers to guide the tape and prevent twisting or overlapping. Eliminating the use of such extraneous rollers avoids elements that can come into contact with the adhesive on the removed tape that can build up and cause operational problems. Because the MTRA is relatively small and compact (about the size of a small riding lawn mower) the operator can easily observe potential and actual points of tape separation from the paved surface and the tape as it is being wound onto the spindle and make speed and steering adjustments as necessary to keep removed tape aligned with the spool and avoid twisting of the tape.

When a tape separates (breaks) or a roll end is encountered during a tape removal operation the two free ends of the tape can be attached glue-surface to glue-surface which is 180 degrees out of alignment. In the subsequent first spool revolution the tape self-aligns the reverse 180 degrees on the spooling tape.

FIG. 8 is a depiction of tape being removed with the point of release from the paved surface perpendicular to the spooled tape. As shown in FIG. 8 the boom arm 31 is in an upward position so that the pulling of the tape 35 is at a perpendicular direction or angle with respect to the paved surface 37 at the release point 36. The distance from the release point B2 to the spool A2 can be varied as discussed above. The tensile strength needed to release the tape varies. More or less tensile force can be applied by spool using throttle control 7. The boom arm 31 can be lowered in direction 39 to reduce the distance between B2 and A2 thereby reducing the force applied and angle thereof to the tape at the release point 36.

FIG. 9 is a depiction of tape being spooled (removed) with the point of release from the paved surface far in front of perpendicular to the spool. In FIG. 9 the tape 35 is pulled from the paved surface 37 at a point of release 36 far forward of perpendicular to the take up spool 22.

FIG. 10 is a depiction of the remove of tape while raising the boom arm. FIG. 10 shows boom arm 31 in a downward position from which it can be raised in the direction of arrow 39. There is a direct relationship between the release point of the tape 35 from the paved surface 37 and the distance to the pickup point of the tape 35 on the spool on spool spindle 22. Due to stretching and adhesive properties that increase with the length of tape being removed a greater the tensile force is needed to pull the tape 35 away from the paved surface 37 from the spooling roll. For example, each of FIGS. 7, 8, 9 show a different distance between tape 35 release points 36 and pick up points on the spool 22 (at O.D. of spooled tape which varies). In FIG. 7 it can be seen that the distance A1 to B1 is greater than FIG. 8 distance A2 to B2 which is greater than FIG. 9 distance A3 to B3. Consequently, in comparison of FIGS. 7, 8, 9, FIG. 7 requires the least amount of tensile force for removal followed by FIG. 8 which requires more followed by FIG. 7 that requires most.

Figure 11A:
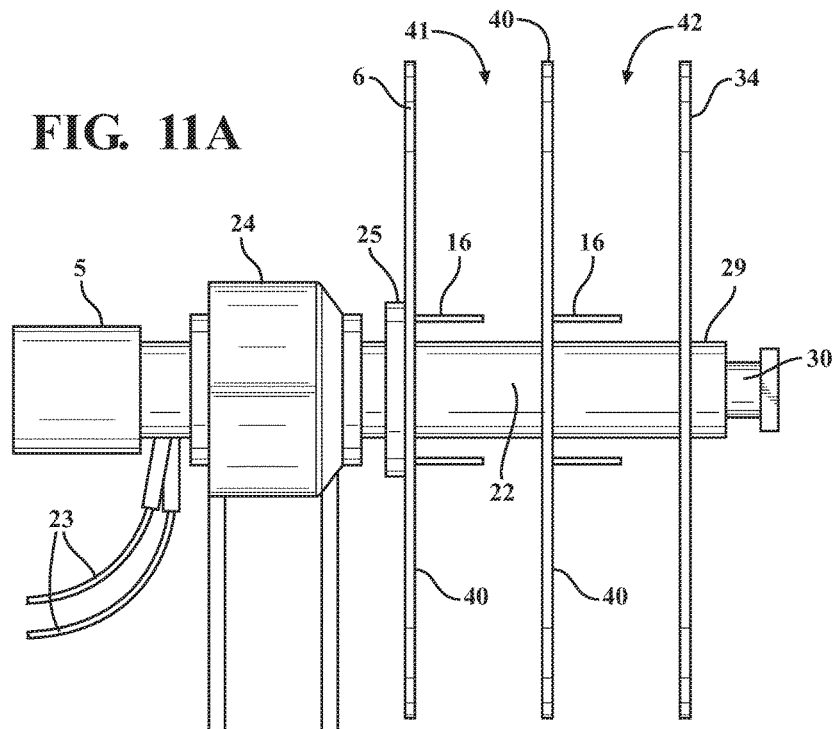
FIG. 11A shows the features of FIG. 5 together with an internal separation disc on the spool which allows for separate lines of tape to be removed from a paved surface simultaneously.
Figure 11B:
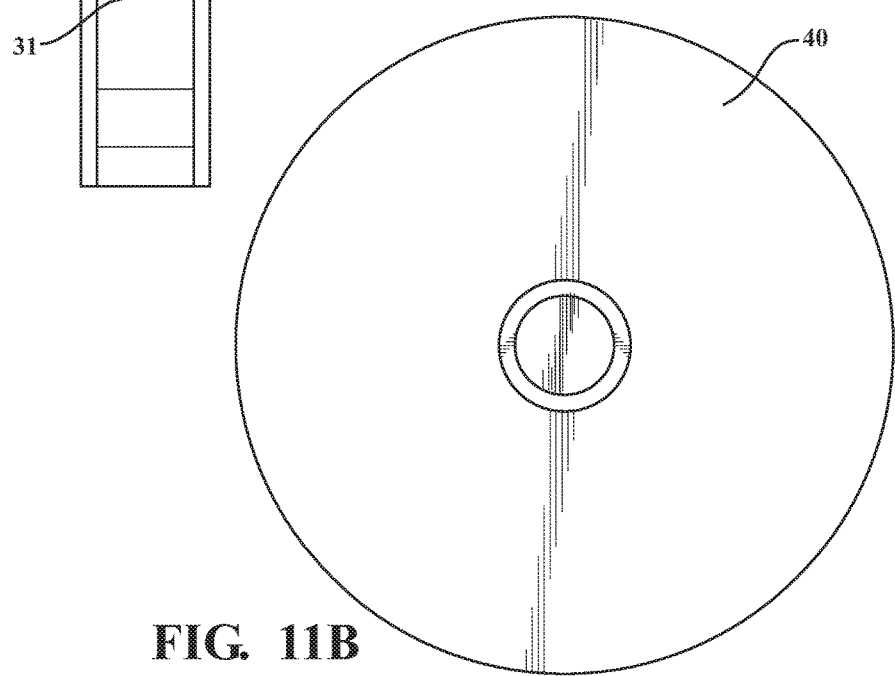
FIG. 11B is a side view of the spool and internal separation disc of FIG. 11A.

FIG. 11A shows the features of FIG. 5 together with an internal separation disc on the spool which allows for separate lines of tape to be removed from a paved surface simultaneously. FIG. 11B is a side view of the spool and the internal separation disc of FIG. 12A. By adding one or more internal separation disc(s) to the spool two or more lines of tape can be removed from a paved surface simultaneously. Examples of the use of multiple lines of tape include double yellow lines separating bi-directional traffic or double white lines demarking bicycle lanes. Being able to simultaneously remove multiple lines of tape reduces the time and labor required to remove such lines by half or more as compared to manual removal or single line capabilities. This configuration also reduces the number of stops required to remove fully spooled tape from the spool as compared to the single slot 41 configuration as shown in FIG. 5 when using the apparatus in FIG. 11 to remove tape 35 that is in one continuous non-adjacent line. In such a case after slot 41 is filled the boom arm 31 can be moved sideways thereby aligning the second spool slot 42 with the next line of tape that is to be removed. After both slots 41, 42 are both filled the machine is stopped at which time both spooled rolls are removed and placed on the pavement for pickup and disposal. The spooled rolls can also be placed on roll holders attached to the machine (not shown) so that the spooled rolls can be stock piled with greater distances between stock piles making removal of same more efficient and less time consuming.

As compared to FIG. 5 the embodiment of the invention shown in FIG. 11 includes a spool spindle 22 that is long enough to receive multiple cores 16 and one or more internal separation disc 40. Not show are the locking lugs 27 that are operated by turning the control knob 30 as discussed above in reference to FIG. 5. Hydraulic lines 23 control the rotational direction of hydraulic motor 5 that is connected to spool spindle 22 by a coupling that is within coupler body 24. The fixed inner retainer disc 6 is connected to its connecting flange 25. A core 16 sized to match the width of the tape being removed is slid on spool spindle 22 against the fixed inner retaining disc 6 followed by internal separation disc 40 thus creating slot 41. Next a second core 16 also of appropriate width is slid onto spindle 22 against fixed internal separation disc 40. Then the removable outer retainer disc 34 is slid against this second core creating the second slot 42 and outer disc mounting flange 29 is locked in place. Control knob locking jamb nut 30 or other securing device is rotated locking the cores into place for rotation with the spool spindle 22.

Figure 12A:
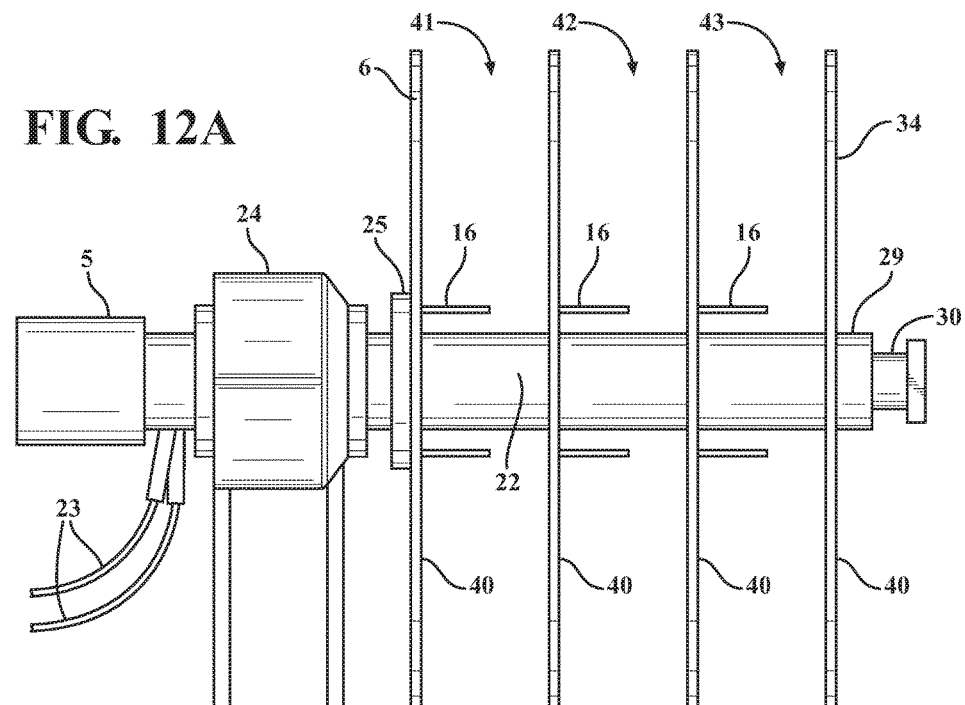
FIG. 12A shows the features of FIG. 11 together with an additional internal separation disc on the spool.
Figure 12B:
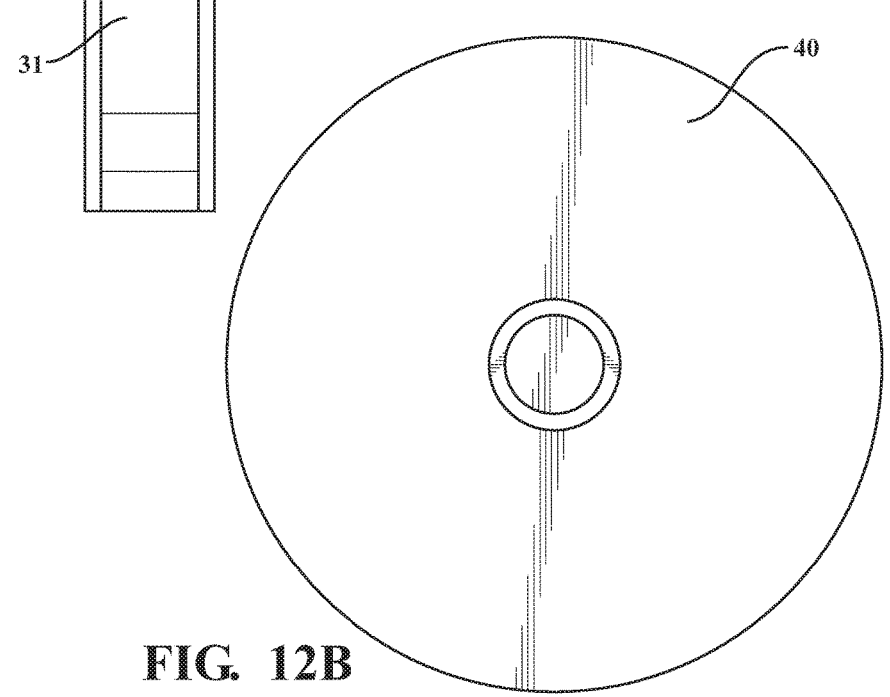
FIG. 12B is a side view of the spool and an internal separation disc of FIG. 12A

FIG. 12A shows the features of FIG. 11 together with an additional internal separation disc on the spool. FIG. 12B is a side view of the spool and an internal separation disc of FIG. 12B. The configuration shown in FIG. 12 allows for the removal of two parallel lines of tape that have a space between them, an example of which are center double yellow lines separating bi-directional vehicular traffic or double white lines designating bicycle paths. The embodiment of the invention shown in FIG. 12 is the same as shown in FIG. 10 but with an additional internal separation disc 40. In FIG. 12 slot 42 has a third core 16 on spindle 22 that matches the width of the space between the two parallel lines of tape being removed simultaneously. Slots 41 and 43 match the widths of the double separated lines being removed simultaneously. This configuration can remove separated longitudinal pavement marking tape 35 simultaneously thereby reducing the time required by half as compared to manual removal or single line removal capabilities of other machines. The embodiment of FIG. 12 can also remove three or more adjacent lines of tape simultaneously that might be used to mark an extra wide area of pavement.

Figures 13, 13A, 13B:
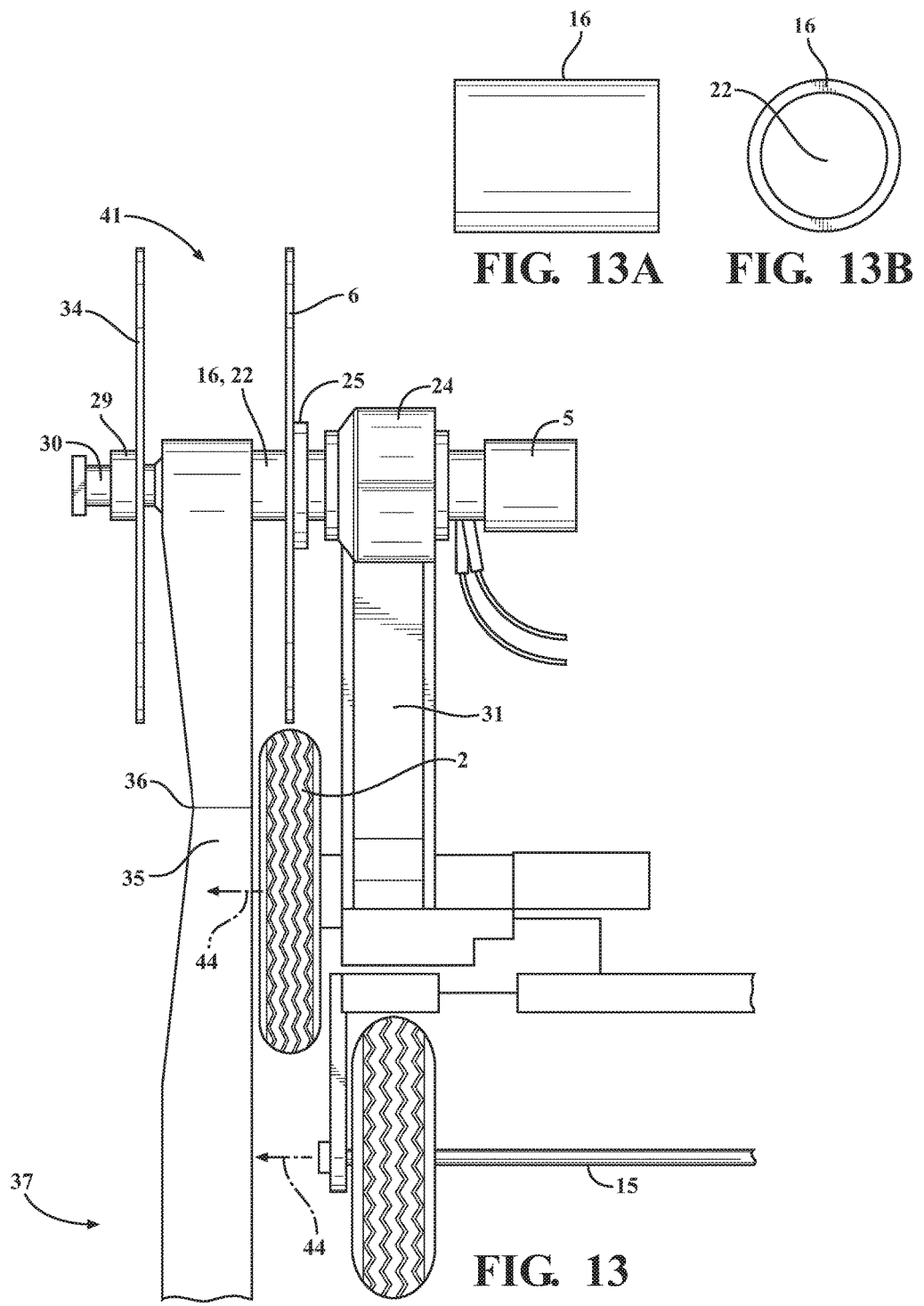
FIG. 13 shows one manner in which the drive and steering wheels are offset from the tape on the paved surface.
FIG. 13A is a face on view of a variable width disposable friction surface wind up core according to one embodiment of the present invention.
FIG. 13B is a side view of the variable width disposable friction surface wind up core.

FIG. 13A shows one manner in which the drive and steering wheels are offset from the tape on the paved surface. FIG. 13A is a face on view of a variable width disposable friction surface wind up core according to one embodiment of the present invention. FIG. 13B is a side view of the variable width disposable friction surface wind up core. In the embodiment of the MTRA shown in FIG. 13 the drive and steering wheels 2, 15 are offset from the tape 35 on the paved surface 37. If either wheel were to ride upon the tape as it is being pulled the tape would break. In FIG. 13 the release point of the tape is behind the rear drive wheel 2 as shown in FIG. 7. Having the tape release point 36 behind the rear wheel/drive axle 2 provides for optimal tape removal speed.

The MTRA of the present invention allows for line marking tape to be removed at a rapid speed due to its compact size, operator positioning, operator's manual control and the operator's ability to raise and lower the boom arm 31 and move the boom arm 31 from side to side. Optimum tape removal speed can be achieved when the operator keeps the tape 35 release point 36 behind rear axle wheel assembly 2. This position can be maintained during operation while the visually determines that the tape is undamaged therefore being able to have high tensile strengths applied to it. Should the operator see a defect in the tape the operation of the MTRA can be slowed so as to reduce the tensile strength or pulling force applied to the tape 35 at the release point 36. For example, the spool rotational speed can be adjusted until the tape is being pulled upward perpendicular to the paved surface. The operator can then continue to reduce the spool 6 speed until the minimum tensile strength is applied that will not separate (break) the tape 35. If a lesser tensile strength or pulling force is needed, the boom arm 31 can be lowered to further reduce the tensile strength or pulling force applied to any weak point(s) thereby allowing the machine to resume operation without stopping to splice any breaks which would reduce removal efficiency.

The MTRA of the present invention was designed and developed to remove temporary tape from paved surfaces rapidly, efficiently and with fewer workers. The use thereof will greatly reduce the physical labor required to manually pull such tapes from road surfaces, eliminating physical injury or job time loss to workers. In addition to reducing the labor of handling removed tape both on the job and in the construction yard, the present invention reduces disposal costs.

The MTRA of the present invention can be used to remove lane marking tapes successfully, efficiently and cost effectively. Its design and function allows tape separations (breaks) due to traffic trauma, paved surface irregularities and tape ends to be spliced rapidly and efficiently. Its compact size, operator friendly construction, boom repositioning ability both up and down and side to side, speed control of the drive axle as well as rotational speed control through foot and hand controls throttles provide versatility over prior manual methods of tape removal and disposal.

In further embodiments of the present invention the frame or chassis can be configured to be pushed by an operator walking behind the device rather than an operator riding and driving the device. In other embodiments the apparatus could be self-propelled with the operator walking behind and guiding the apparatus.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A temporary tape removal apparatus that comprises:
a chassis having a front end and a rear end with drive wheels near the rear end of the chassis and guiding wheels near the front end of the chassis;
a boom arm extending outward from the chassis and being movable between up and down and side to side positions relative to the chassis;
a spool assembly including a rotatable spool for winding used temporary tape thereon mounted on the boom arm, the boom arm extending outward from the front end of the chassis so that the spool is located beyond the front end of the chassis; and
controllable drive means to rotate the rotatable spool.

2. A temporary tape removal apparatus according to claim 1, further comprising a steering mechanism that is coupled to the guide wheels to steer the apparatus.

3. A temporary tape removal apparatus according to claim 1, further comprising an engine to supply power to rotate the drive wheels.

4. A temporary tape removal apparatus according to claim 1, further comprising a removable disposable core provided on the rotatable spool for winding tape thereon.

5. A temporary tape removal apparatus according to claim 1, wherein the rotatable spool includes a rotatable spool spindle having an inner retaining disc and a removable outer retaining disc thereon.

6. A temporary tape removal apparatus according to claim 5, wherein the rotatable spool further includes a removable disposable core between the inner retaining disc and the removable outer retaining disc for winding tape thereon.

7. A temporary tape removal apparatus according to claim 5, wherein the rotatable spool further includes at least one removable separator disc between the inner retaining disc and the removable outer retaining disc.

8. A temporary tape removal apparatus according to claim 7, wherein two or more removable disposable cores are provided on the spool spindle.

9. A temporary tape removal apparatus according to claim 7, wherein there is a gap between adjacent removably disposable cores.

10. A temporary tape removal apparatus according to claim 1, further comprising a seat for an operator.

11. A method of removing lane marking temporary tape from pavements which method comprises:
providing a temporary tape removal apparatus that comprises:
a chassis having a front end and a rear end with fixed wheels near the rear end of the chassis and guiding wheels near the front end of the chassis;
a boom arm extending outward from the chassis and being movable between up and down and side to side positions relative to the chassis;
a spool assembly including a rotatable spool for winding used temporary tape thereon mounted on the boom arm, the boom arm extending outward from the front end of the chassis so that the spool is located beyond the front end of the chassis; and
controllable drive means to rotate the rotatable spool;
moving the temporary tape removal apparatus along a pavement having a length of lane marking tape thereon; and
pulling the temporary tape off the pavement by winding the tape onto the spool.

12. A method of removing lane marking temporary tape from pavements according to claim 11, wherein the temporary tape removal apparatus is moved along the pavement by being driven along the pavement.

13. A method of removing lane marking temporary tape from pavements according to claim 11, wherein the temporary tape removal apparatus is driven along the pavement by an operator riding on the temporary tape removal apparatus.

14. A method of removing lane marking temporary tape from pavements according to claim 11, wherein the temporary tape removal apparatus is moved along the pavement by being pushed along the pavement.

15. A method of removing lane marking temporary tape from pavements according to claim 11, wherein the pulling of the temporary tape off the pavement comprises pulling a single line of temporary tape.

16. A method of removing lane marking temporary tape from pavements according to claim 11, wherein the pulling of the temporary tape off the pavement comprises simultaneously pulling two or more lines of temporary tape.

17. A method of removing lane marking temporary tape from pavements according to claim 16, wherein the lines of tape are spaced apart from one another.

18. A method of removing lane marking temporary tape from pavements according to claim 11, wherein the removed tape is wound up on a disposable core member that is removably provided on the spool.

19. A method of removing lane marking temporary tape from pavements according to claim 16, wherein each of the removed lines of tape are wound up on separate disposable core members that are removably provided on the spool.

20. A method of removing lane marking temporary tape from pavements according to claim 11, wherein at least one of the rotational speed of the spool or speed of moving the temporary tape removal apparatus along a pavement is controlled to control the force applied to pull the lane marking tape off the pavement.

\* \* \* \* \*

UNITED STATES PATENT AND TRADEMARK OFFICE
CERTIFICATE OF CORRECTION

PATENT NO. : 10,112,794 B1  
APPLICATION NO. : 15/808646  
DATED : October 30, 2018  
INVENTOR(S) : James P. Shea Page 1 of 1

It is certified that error appears in the above-identified patent and that said Letters Patent is hereby corrected as shown below:

In the Specification

Column 4, Line 20 should be changed from "places works" to --places workers--

Column 7, Line 49 should be changed from "by FIG. 7" to --by FIG. 9--

Signed and Sealed this
Twelfth Day of February, 2019

Andrei Iancu
*Director of the United States Patent and Trademark Office*